United States Patent [19]

Goldstein

[11] Patent Number: 4,663,753
[45] Date of Patent: May 5, 1987

[54] RECORDING MEDIUM AND METHOD OF MAKING THE SAME

[75] Inventor: Bernard Goldstein, Princeton, N.J.

[73] Assignee: RCA Corporation, Princeton, N.J.

[21] Appl. No.: 738,396

[22] Filed: May 28, 1985

[51] Int. Cl.$^4$ .......................... G11B 3/00; G11B 7/26
[52] U.S. Cl. .................................. 369/132; 369/276; 369/288
[58] Field of Search ....................... 204/192 C, 192 R; 428/64, 65; 369/132, 276, 288

[56] References Cited

U.S. PATENT DOCUMENTS

| | | | |
|---|---|---|---|
| 3,982,066 | 3/1976 | Nyman et al. | 369/276 |
| 4,004,080 | 1/1977 | Vossen, Jr. et al. | 369/276 |
| 4,044,379 | 8/1977 | Halter | 369/144 X |
| 4,072,985 | 2/1978 | Kaganowicz et al. | 369/276 |
| 4,077,051 | 2/1978 | Vossen, Jr. | 369/276 |

OTHER PUBLICATIONS

Vossen et al., "Thin Film Processes", (1978) pp. 48–73.
N. Schwartz, "Reactive Sputtering", Bell Telephone Labs, Inc., pp. 325–334.
A. J. Purdes et al., "Copper/Oxygen Glow Discharge Spectrometry", J.Vac.Sci.Technol., vol. 14, No. 1, Jan.-/Feb. 1977, pp. 98–101.

Primary Examiner—Aristotelis M. Psitos
Attorney, Agent, or Firm—Joseph S. Tripoli; Donald S. Cohen

[57] ABSTRACT

A method is disclosed for recording information wherein an information-containing surface relief image is mechanically micromachined into a recording medium formed of a copper/oxygen amalgam containing 8 to 11 atomic weight percentage of oxygen and having a grain size of 500 Angstroms or less and wherein the amalgam has a hardness of 250 to 320 on the Knoop hardness scale.

8 Claims, 5 Drawing Figures

RECORDING MEDIUM AND METHOD OF MAKING THE SAME

This invention relates to a recording medium for use in the manufacture of conventional audio records and high density information discs, such as capacitance electronic discs and optical discs.

BACKGROUND OF THE INVENTION

Different forms of signal information, such as audio information, video information, and electronic data processing programs and data, are routinely recorded in the form of information-containing surface relief images. The signal information is recorded in various types of information-containing signal formats, such as analog signal formats or digital signal formats, depending on the method to be used to reproduce the recorded information.

Various methods have heretofore been used for transcribing signal information in the form of a surface relief image into a recording medium. One of the earliest methods was to form the surface relief image in a wax or lacquer recording medium using a heated stylus. The heated stylus method is marginal for conventional records and was also found to be totally unsatisfactory for high density information discs because of the low resolution and poor signal-to-noise ratios of the recorded information.

Later, an electron beam was used to record information-containing surface relief patterns in a recording medium comprised of an electron beam resist. Electron beam recording presents difficulties in consistently producing high resolution surface relief images with the high signal-to-noise ratios required for high density information because of variations encountered in the electron beam resists and in the development of the exposed resists.

A laser beam has also been used to record information into a laser-sensitive recording medium. Laser recording is also difficult to implement. Laser-recorded surface relief images tend to be highly irregular at the outer edges of the signal track which reduces the resolution capability and causes problems in replicating laser recorded media.

Mechanically micromachining a surface relief image into an electrodeposited metal substrate has also been used. This method was disclosed by G. J. Halter in U.S. Pat. No. 4,044,379 entitled "Method And Apparatus For Electromechanical Reproduction of Short Wavelength Modulation In A Metal Master," the disclosure of which is incorporated by reference. The mechanical micromachining method disclosed by Halter was found to be satisfactory for recording media for both conventional records and high density information discs. The surface relief images which were obtained under ideal conditions had exceptionally high signal resolution, excellent signal-to-noise ratios, and the recorded metal substrates could be readily reproduced numerous times using conventional matrixing methods as opposed to the recorded media formed by the heated stylus method, electron beam recording, and laser recording, which could only be used to form a single replica.

Certain problems, however, were encountered with the metal recording medium used in the mechanical micromachining method disclosed by Halter. The recording medium of Halter is prepared by electrodepositing bright acid copper on a suitable supporting substrate. It was found that the electrodeposition process had to be very closely controlled to obtain electrodeposited copper with the satisfactory properties for mechanical micromachining. However, even under what apparently were ideal electrodeposition conditions, substrates were often obtained which had properties which were not totally satisfactory for use as recording media using the Halter method.

It would be highly advantageous to obtain a recording medium which can be consistently produced having the required properties for mechanical micromachining.

SUMMARY OF THE INVENTION

A method is disclosed for recording information wherein an information-containing surface relief image is mechanically micromachined into a recording medium formed of a copper/oxygen amalgam of granular copper having a grain size of 500 Angstroms or less and about 8 to 11 atomic weight percentage of oxygen with an amalgam hardness of 250 to 320 on the Knoop hardness scale.

DETAILED DESCRIPTION OF THE INVENTION

Figure 1:
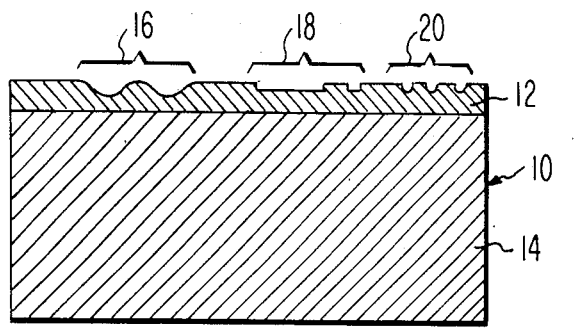
FIG. 1 is a cross-sectional view of a recorded medium of this invention shown formed on the surface of a supporting substrate.

The term amalgam as used in the description of the present invention refers to an intimate mixture of elemental granular copper and elemental oxygen.

The term mechanical micromachining as used in the description of this invention refers to physically contacting a recording medium with a tool piece, such as a cutter, which removes a portion of the material of the recording medium to form a surface relief image in the recording medium having a nominal dimension of 5 Angstroms or less with a total deviation from nominal of ±10. The term mechanical micromachining is to be distinguished from recording with a heated stylus, wherein the recording medium is deformed, and electron beam and laser recording, wherein the recording medium is contacted with an energy-containing beam.

It was empirically determined from an evaluation of electrodeposited copper substrates found to be satisfactory for mechanical micromachining that the hardness of the recording media should be about 250 to 320 on the Knoop hardness scale measured at 15 grams and the grain size of the copper should be about 500 Angstroms or less with grain sizes between 200 to 500 Angstroms being generally quite satisfactory.

It was found in accordance with the present invention that copper/oxygen amalgam of granular copper having a grain size of 500 Angstroms or less and about 8 to 11 atomic weight percentage of oxygen with an amalgam hardness of 250 to 320 on the Knoop hardness scale can be consistently formed using conventional methods. These copper/oxygen amalgams, when used as recording media, can be mechanically micromachined with high resolution information-containing surface relief images having excellent signal-to-noise ratios. It was further found that the optimum copper/oxygen amalgam for use in the present invention contains about 9.5 atomic weight percent of oxygen and that the optimum combination of properties for mechanical micromachining can be most consistently obtained with this amalgam.

The amalgam compositions which are employed in the present invention are known in the literature though no significant utilities have heretofore been disclosed for these materials. The amalgams can be formed by various methods. Sputter deposition is by far the simplest method to accurately control the composition of the amalgam and is therefore the most preferred method for formation of recording media. In order to facilitate the further description of this invention, specific emphasis will therefore be placed on formation of the recording media of this invention by sputter deposition. It should be appreciated, however, that amalgams employed in this invention can be formed by other methods, such as chemical vapor deposition and the like.

In the method of sputtering employed to produce the copper/oxygen amalgams used in the present invention, copper is sputtered through a mixture of gases comprised of oxygen and an inert gas, such as argon or neon. A wide variety of sputter-deposited materials, including essentially pure copper metal, amalgams of copper and oxygen, and the oxides of copper, can be obtained in the sputter deposition process depending upon the partial pressure of the oxygen in the gas mixture. The chemical composition of the sputter-deposited products can be varied with a high degree of precision by controlling the partial pressure of the oxygen in the sputtering gas mixture.

In sputter deposition of copper where no oxygen is present with the exception of the background oxygen of about 0.2%, the essentially pure copper which is deposited is soft, having a Knoop hardness of about 200, and the copper has a grain size of about 2000 Angstroms. This essentially pure copper metal is unsuitable as a recording medium because it is too soft and the grain size is excessive. If the partial pressure of the oxygen is increased slightly, there is a marked increase in the hardness of the deposited material. As the partial pressure of oxygen is increased further, there is a leveling off of the hardness, but the grain size of the deposited copper continues to decrease until the deposits contain about 11 atomic weight percent of oxygen. The sputtered deposits which are obtained contain elemental granular copper and elemental oxygen with the oxygen being distributed within the fine grain structure of the granular copper deposit. The amalgam can contain, in addition to copper and oxygen, minor amounts of other materials which do not adversely affect the mechanical micromachinability of the deposited amalgam. When the partial pressure of the oxygen is increased such that the sputtered deposit contains more than 11 atomic weight percent of oxygen, there is a marked change in the chemistry of the amalgam as oxides of copper start to form these materials are not suitable for use as a recording medium.

Turning to the drawing, in FIG. 1 there is shown a section of a recorded substrate 10. The recorded substrate 10 has a recording medium 12 of a copper/oxygen amalgam of this invention formed on the surface of a supporting substrate 14, such as an aluminum disc or the like. In the recording medium 12, there is shown, for purposes of illustration, a portion which includes an analog signal image 16 of the type used for conventional audio records and capacitance electronic discs. There is also shown in the recorded media a length defined digital signal image 18 and a binary digital signal image 20 of the types which are typically employed for optical discs. The supporting substrate 14 on which the recording medium 12 is formed, while not an essential element, is highly desirable as it both facilitates the deposition of the recording medium 12 and provides additional rigidity to the recording medium 12 during mechanical micromachining and replication.

Figure 2:
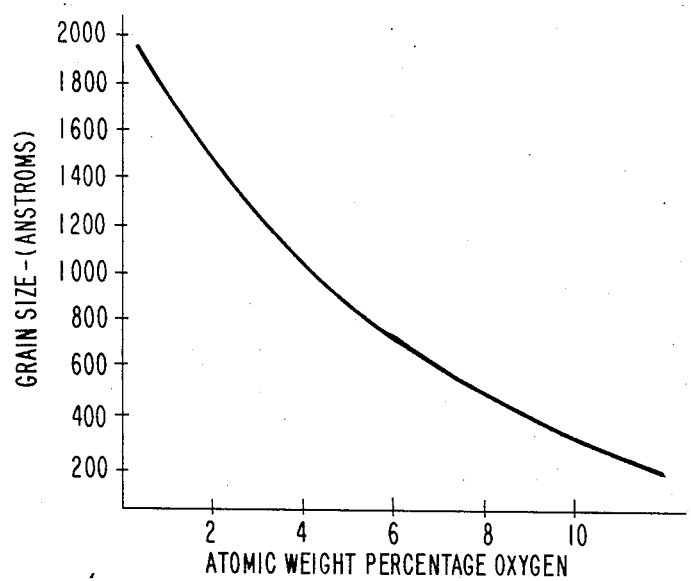
FIG. 2 is a graphic representation showing the relationship of the atomic weight percentage of oxygen in copper/oxygen amalgam to the grain size of the copper in the amalgams.

In FIG. 2, there is shown the relationship between the atomic weight percent of oxygen in the copper/oxygen amalgam to its grain size. This graph was developed by varying the partial pressure of oxygen during the sputtering process to obtain samples of amalgams containing different atomic weight percentages of oxygen. The atomic weight percentage of oxygen was determined by secondary ion-mass spectroscopy with the measured values being compared directly with a layer of copper implanted with a known flux of oxygen ions.

Figure 3:
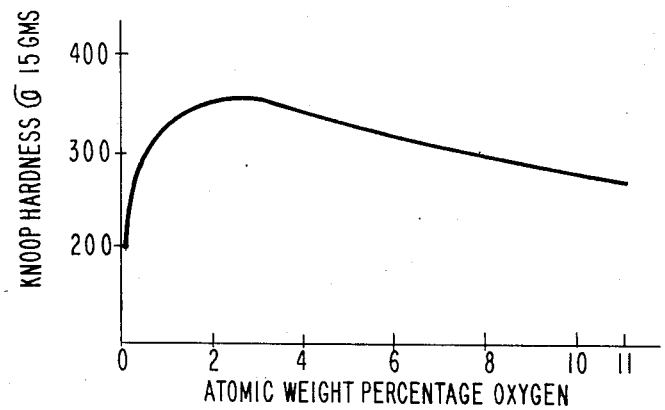
FIG. 3 is a graphic representation of the relationship of hardness to the atomic weight percentage of oxygen in copper/oxygen amalgams.

In FIG. 3, there is graphically shown the result obtained by comparing the atomic weight percentage of oxygen of the copper/oxygen amalgam with its Knoop hardness. As can be seen from the graph, a small amount of oxygen significantly increases the hardness of the amalgam and then there is a leveling off with slight decrease in hardness as the amount of oxygen in the amalgam increases.

The recording media prepared from the copper/oxygen amalgams of this invention were found to be equivalent or superior to selected satisfactory electrodeposited copper substrates of the type heretofore employed in the Halter method. A series of the electrodeposited copper recording media were evaluated for physical properties and only those having the required properties of hardness and grain size for mechanical micromachining were selected for use in the evaluations. Recording media were prepared from the amalgams of copper and oxygen which contained between 8 and 11 atomic weight percent of oxygen. All of the recording media prepared from the copper/oxygen amalgams having between 8 to 11 atomic weight percentage of oxygen were found to have the specified hardness of about 250 to 320 on the Knoop hardness scale and a copper grain size of 500 Angstroms or less.

Figure 4:
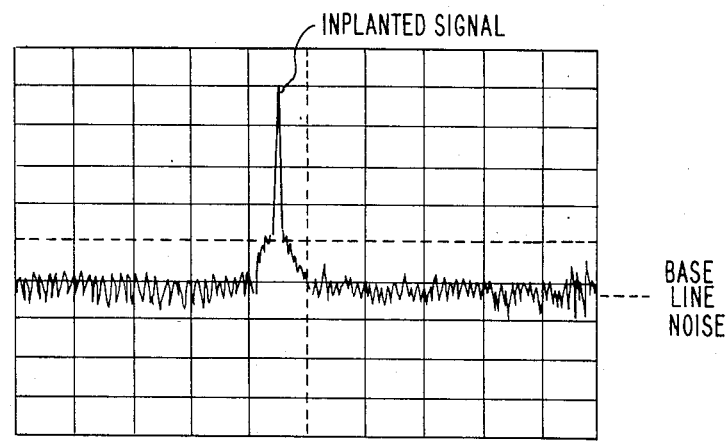
FIG. 4 is a tracing showing the signal-to-noise ratio of a recorded signal obtained with a known satisfactory electrodeposited copper recording medium according to the Halter method.
Figure 5:
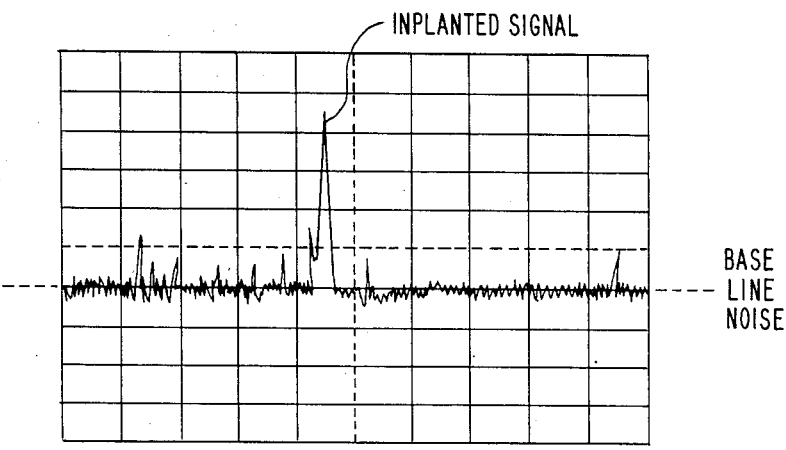
FIG. 5 is a tracing showing the signal-to-noise ratio of a recorded signal obtained with a copper/oxygen amalgam of this invention.

The selected electrodeposited recording media of the type used in the Halter media and recording media of this invention were each mechanically micromachined with an identical test signal pattern which contained in the test pattern a 5 megahertz signal. The recordings were made using a diamond cutter. After the test signals were cut into the recording media, the signals were read by laser playback. In FIG. 4, there is shown a typical tracing obtained with the electrodeposited copper recording media. The base line noise and the implanted signal are identified on the figure. In FIG. 5, there is shown a typical tracing obtained with an amalgam recording media of this invention. The base line noise level and implanted signal are identified on the figure.

By comparison of FIGS. 4 and 5, and from a visual examination of the cut surface relief image, it was ascertained that the recorded media made from the copper/oxygen amalgams of the present invention were equivalent or superior to those obtained with the selected electrodeposited recording media.

The further use of the recorded amalgam media in a conventional matrixing process and an evaluation of records and discs derived from the recorded amalgam media likewise established that equivalent to superior recordings are obtained with the method of this invention as compared to the Halter method using electrodeposited copper recording media. Furthermore, it was found that superior results can be consistently obtained with the method of the present invention as compared to the heated stylus, electron beam and laser recording methods.

What is claimed is:

1. In the method for recording information wherein an information-containing surface relief image is mechanically micromachined into a recording medium, the improvement which comprises: employing as the recording medium a copper/oxygen amalgam of granular copper having a grain size of 500 Angstroms or less and about 8 to 11 atomic weight of oxygen, said amalgam having a hardness of about 250 to 320 on the Knoop hardness scale.

2. The method according to claim 1 wherein the amalgam contains about 9.5 atomic weight percent of oxygen.

3. The method according to claim 1 wherein the recording medium comprises a layer of said amalgam on a supporting substrate.

4. The method according to claim 1 wherein the recording medium comprises a layer of said amalgam sputter-deposited on the supporting substrate.

5. The method according to claim 1 wherein the granular copper has a grain size of from 200 to 500 Angstroms.

6. An information storage device comprised of a recording medium having an information-containing surface relief pattern, a surface thereof wherein the recording medium is a copper/oxygen amalgam of granular copper having a grain size of 500 Angstroms or less and about 8 to 11 atomic weight percentage of oxygen, said amalgam having a hardness of about 250 to 320 on the Knoop hardness scale.

7. The information storage device according to claim 6 wherein the amalgam contains about 9.5 atomic weight percent of oxygen.

8. The information storage device according to claim 6 wherein the recording medium comprises a layer of said amalgam on a supporting substrate.

* * * * *